(12) United States Patent
Walsh et al.

(10) Patent No.: US 9,679,730 B2
(45) Date of Patent: Jun. 13, 2017

(54) CIRCUIT INTERRUPTER WITH WIRELESS UNIT, COMMUNICATION SYSTEM INCLUDING THE SAME AND ASSOCIATED METHOD

(71) Applicant: EATON CORPORATION, Cleveland, OH (US)

(72) Inventors: Patrick Thomas Walsh, Coraopolis, PA (US); Theodore James Miller, Oakdale, PA (US)

(73) Assignee: EATON CORPORATION, Cleveland, OH (US)

( * ) Notice: Subject to any disclaimer, the term of this patent is extended or adjusted under 35 U.S.C. 154(b) by 88 days.

(21) Appl. No.: 14/672,451

(22) Filed: Mar. 30, 2015

(65) Prior Publication Data
US 2016/0293372 A1 Oct. 6, 2016

(51) Int. Cl.
| | |
|---|---|
| H02H 3/00 | (2006.01) |
| H01H 71/04 | (2006.01) |
| H01H 71/12 | (2006.01) |
| H04L 29/08 | (2006.01) |
| H04W 4/00 | (2009.01) |
| H02H 1/00 | (2006.01) |

(Continued)

(52) U.S. Cl.
CPC ........... H01H 71/04 (2013.01); H01H 71/12 (2013.01); H02H 1/0061 (2013.01); H02H 3/006 (2013.01); H02H 3/044 (2013.01); H04L 67/02 (2013.01); H04W 4/008 (2013.01); H01H 2300/052 (2013.01); H02H 3/04 (2013.01); H02H 3/44 (2013.01)

(58) Field of Classification Search
USPC .................................................... 361/42–50
See application file for complete search history.

(56) References Cited

U.S. PATENT DOCUMENTS

| 4,428,022 A | 1/1984 | Engel et al. |
| 5,525,985 A | 6/1996 | Schlotterer et al. |
(Continued)

FOREIGN PATENT DOCUMENTS

| EP | 2 549 610 A2 | 1/2013 |
| WO | 2005/101604 A1 | 10/2005 |
| WO | 2006/031792 A2 | 3/2006 |

OTHER PUBLICATIONS

European Patent Office, "International Search Report and Written Opinion" PCT/US2016/023341, Jun. 3, 2016, 12 pp.

*Primary Examiner* — Danny Nguyen
(74) *Attorney, Agent, or Firm* — Eckert Seamans; Nathaniel Wilks; Grant Coffield

(57) ABSTRACT

A circuit interrupter includes a first terminal structured to electrically connect to a power source, a second terminal structured to electrically connect to a load, separable contacts electrically connected between the first terminal and the second terminal and being moveable between a closed position and an open position, an operating mechanism structured to trip open the separable contacts, an electronic trip unit structured to detect a fault condition based on power flowing between the first and second terminals and to retrieve diagnostic or setting information associated with the circuit interrupter, and a wireless unit structured to provide the setting or diagnostic information associated with the circuit interrupter to an external device via a wireless communication protocol.

20 Claims, 3 Drawing Sheets

(51) Int. Cl.
*H02H 3/04* (2006.01)
*H02H 3/44* (2006.01)

(56) References Cited

U.S. PATENT DOCUMENTS

| | | | |
|---|---|---|---|
| 8,760,825 B2 * | 6/2014 | Erger | H02H 1/0084 |
| | | | 361/42 |
| 2003/0193767 A1 * | 10/2003 | Vicente | H02H 3/006 |
| | | | 361/93.1 |
| 2007/0055889 A1 | 3/2007 | Henneberry et al. | |
| 2009/0213515 A1 | 8/2009 | Phillips et al. | |
| 2014/0111898 A1 | 4/2014 | Williams et al. | |

* cited by examiner

CIRCUIT INTERRUPTER WITH WIRELESS UNIT, COMMUNICATION SYSTEM INCLUDING THE SAME AND ASSOCIATED METHOD

BACKGROUND

Field

The disclosed concept relates generally to circuit interrupters and, more particularly, to circuit interrupters with associated settings and diagnostic information. The disclosed concept also relates to communication systems and associated methods, which include circuit interrupters with associated settings and diagnostic information.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of an operator handle or automatically in response to a detected fault condition. Typically, such circuit breakers include an operating mechanism, which is designed to rapidly open the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

It is well known to employ trip units which utilize a microprocessor to detect various types of overcurrent trip conditions and provide various protection functions, such as, for example, a long delay trip, a short delay trip, an instantaneous trip, and/or a ground fault trip. The long delay trip function protects the load served by the protected electrical system from overloads and/or overcurrents. The short delay trip function can be used to coordinate tripping of downstream circuit breakers in a hierarchy of circuit breakers. The instantaneous trip function protects the electrical conductors to which the circuit breaker is connected from damaging overcurrent conditions, such as short circuits. As implied, the ground fault trip function protects the electrical system from faults to ground.

The earliest electronic trip unit circuit designs utilized discrete components such as transistors, resistors and capacitors. More recently, designs, such as disclosed in U.S. Pat. Nos. 4,428,022; and 5,525,985, have included microprocessors, which provide improved performance and flexibility. These digital systems sample the current waveforms periodically to generate a digital representation of the current. The microprocessor uses the samples to execute algorithms, which implement one or more current protection curves.

Electronic trip units have various settings which can be adjusted to change the behavior of the electronic trip unit. In several known types of circuit breakers, an interface panel, such as the interface panel 2 shown in FIG. 1, is used to adjust settings of the electronic trip unit. The interface panel 2 includes five rotary switches 4 which are used to adjust different settings of the electronic trip unit.

Using the interface panel 2 to change settings of the circuit breaker requires approaching the circuit breaker and physically interacting with the rotary switches 4 on the interface panel 2. However, it is not ideal for technicians to approach circuit breakers as it can place them in a dangerous situation due to the environment around the circuit breaker or the amount of power flowing through the circuit breaker.

Furthermore, the interface panel 2 does not provide any diagnostic information related to the circuit breaker. In some circuit breakers, a display is provided on the circuit breaker in order to view diagnostic information related to the circuit breaker. In some other circuit breakers, no display is provided, but an external module must be physically connected to the circuit breaker to read diagnostic information related to the circuit breaker. In either case, technicians must approach the circuit breaker to obtain the diagnostic information, thus potentially placing them in a dangerous situation.

Cost is also a concern with circuit breakers. Each component of the interface panel 2 adds to the cost of the circuit breaker. Additionally, a display or external module also add cost. It would be desirable to reduce the cost associated with the circuit breaker.

There is room for improvement in circuit interrupters, and in communication systems including circuit interrupters. There is also room for improvement in methods for communicating circuit interrupter information.

SUMMARY

These needs and others are met by embodiments of the disclosed concept, which are directed to a circuit interrupter including a wireless unit structured to provide setting or diagnostic information associated with the circuit interrupter to an external device via a wireless communication protocol. These needs and others are also met by embodiments of the disclosed concept which are directed to a method for communicating circuit interrupter information including providing setting or diagnostic information associated with the circuit interrupter to the external device via the wireless communication protocol. These needs and others are further met by embodiments of the disclosed concept which are directed to a communication system including a circuit interrupter and an external device, the circuit interrupter including a wireless unit structured to provide setting or diagnostic information associated with the circuit interrupter to an external device via a wireless communication protocol.

In accordance with aspects of the disclosed concept, a circuit interrupter comprises: a first terminal structured to electrically connect to a power source; a second terminal structured to electrically connect to a load; separable contacts electrically connected between the first terminal and the second terminal and being moveable between a closed position and an open position; an operating mechanism structured to trip open the separable contacts; an electronic trip unit structured to detect a fault condition based on power flowing between the first and second terminals and to retrieve diagnostic or setting information associated with the circuit interrupter; and a wireless unit structured to provide the setting or diagnostic information associated with the circuit interrupter to an external device via a wireless communication protocol.

In accordance with other aspects of the disclosed concept, a method for communicating circuit interrupter information comprises: establishing communication with an external device via a wireless communication protocol; retrieving setting or diagnostic information associated with the circuit interrupter; and providing the setting or diagnostic information to the external device via the wireless communication protocol.

In accordance with other aspects of the disclosed concept, a communication system comprises: an external device; and a circuit interrupter structured to communicate with the external device via a wireless communication protocol. The circuit interrupter includes a first terminal structured to electrically connect to a power source; a second terminal structured to electrically connect to a load; separable contacts electrically connected between the first terminal and the second terminal and being moveable between a closed position and an open position; an operating mechanism structured to trip open the separable contacts; an electronic trip unit structured to detect a fault condition based on power flowing between the first and second terminals and to retrieve diagnostic or setting information associated with the circuit interrupter; and a wireless unit structured to provide the setting or diagnostic information associated with the circuit interrupter to the external device via the wireless communication protocol.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
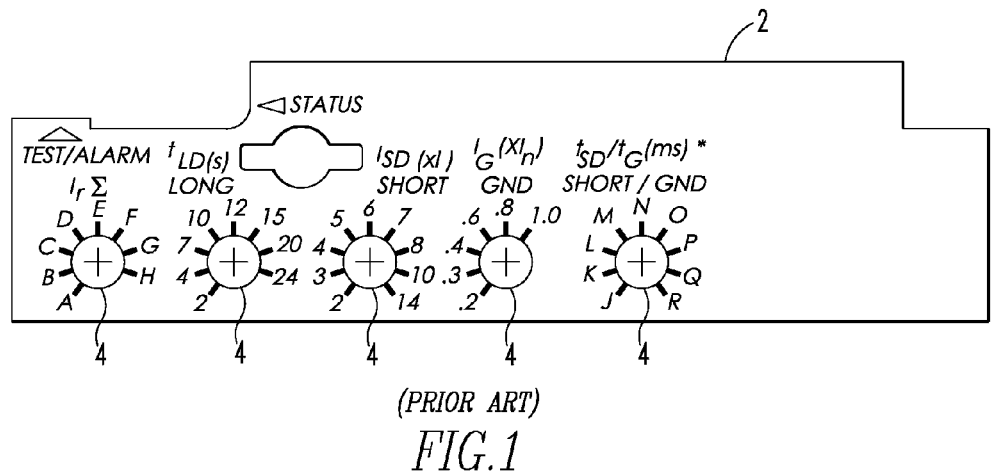
FIG. 1 is a view of an interface panel used in prior art circuit breakers.

Directional phrases used herein, such as, for example, left, right, front, back, top, bottom and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the term "fault condition" shall mean an electrical current based fault that creates a risk of fire or personal shock. Fault conditions may include, without limitation, an overcurrent condition, an arc fault condition, and a ground fault condition. Fault conditions do not include transients, interruptions, sags, swells, waveform distortions, voltage fluctuations, or frequency variations.

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

Figure 2:
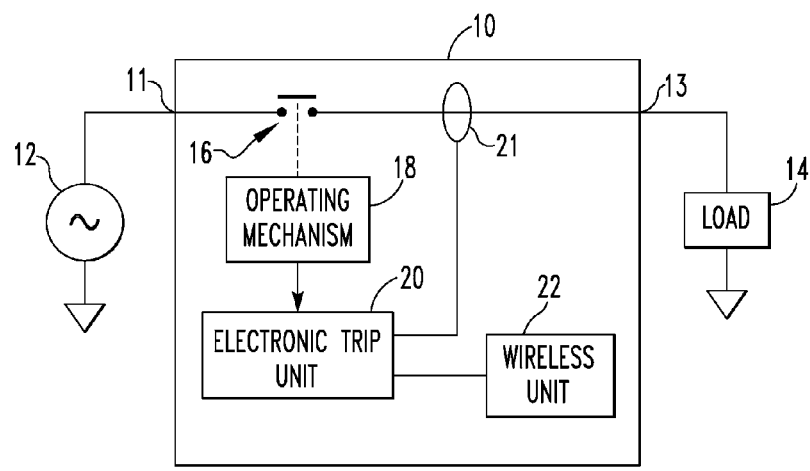
FIG. 2 is a schematic diagram of a circuit interrupter in accordance with an example embodiment of the disclosed concept.

FIG. 2 is a schematic diagram of a circuit interrupter 10 (e.g., without limitation, a circuit breaker) in accordance with an example embodiment of the disclosed concept. The circuit interrupter 10 includes a first terminal 11 structured to electrically connect to a power source 12 (e.g., without limitation LINE power) and a second terminal 13 structured to electrically connect to a load 14. The circuit interrupter also includes separable contacts 16, an operating mechanism 18, an electronic trip unit 20 and a wireless unit 22.

The separable contacts 16 are electrically connected between the first terminal and second terminals 11,13 and are movable between a closed position and an open position. When the separable contacts 16 are closed, the first and second terminals 11,13 are electrically connected. When the separable contacts 16 are open, the first and second terminals 11,13 are electrically disconnected. The operating mechanism 18 is a device structured to trip open the separable contacts 16.

Although separable contacts 16 are disclosed, suitable solid state separable contacts can be employed. For example, the disclosed circuit interrupter 10 includes a suitable circuit interrupter mechanism, such as the separable contacts 16 that are opened and closed by the operating mechanism 18, although the disclosed concept is applicable to a wide range of circuit interruption mechanisms (e.g., without limitation, solid state switches like FET or IGBT devices; contactor contacts) and/or solid state based control/protection devices (e.g., without limitation, drives; soft-starters; DC/DC converters) and/or operating mechanisms (e.g., without limitation, electrical, electro-mechanical, or mechanical mechanisms).

The electronic trip unit 20 is structured to detect a fault condition based on input from sensor such as a current sensor 21 or other sensors. The fault condition may include, without limitation, an over current, a short circuit, a ground fault, or an arc fault. Based on detection of a fault condition, the electronic trip unit 20 controls the operating mechanism 18 to trip open the separable contacts 16.

The electronic trip unit 20 may include a processor and memory. The processor may be, for example and without limitation, a microprocessor, a microcontroller, or some other suitable processing device or circuitry, that interfaces with the memory. The memory can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. It is also contemplated that the electronic trip unit 20 may be implemented in circuitry without the use of a processor or memory. It is also contemplated that other types of trip mechanisms such as, without limitation, thermal or magnetic trip mechanisms may be employed in addition to the electronic trip unit 20.

The electronic trip unit 20 is configured to retrieve setting and diagnostic information associated with the circuit interrupter 10. The setting information may include, without limitation, the full load ampere setting ("Ir"), the long delay time ("LDT"), the short delay pickup ("SDPU") and the short delay time ("SD Time") of the circuit interrupter 10. Adjusting these settings can be adjusted to vary the functional behavior of the electronic trip unit 20. The diagnostic information associated with the circuit interrupter 10 may include, without limitation, a current, a voltage, a number of trips, the last reason for tripping and a manufacturing date.

The wireless unit 22 is configured to communicate with an external device 30 (see FIG. 3), via a wireless communication protocol. The wireless unit 22 may be configured to communicate via any suitable wireless communication protocol such as, without limitation, wi-fi, Bluetooth, Zigbee or other suitable wireless communication protocols.

The wireless unit 22 may include a wireless module to facilitate communicate via a wireless communication protocol and a processor. The processor may be, for example and without limitation, a microprocessor, a microcontroller, or some other suitable processing device or circuitry, that interfaces with the memory.

The wireless unit 22 is also electrically connected with the electronic trip unit 20 and is structured to communicate with the electronic trip unit 20. In the example embodiment of disclosed concept shown in FIG. 2, the wireless unit 22 is configured to communicate with the electronic trip unit 20 via a wired connection, rather than via a wireless communication protocol.

In some example embodiments of the disclosed concept, the wireless unit 22 is structured to provide the setting or diagnostic information associated with the circuit interrupter 10 to the external device 30. Some of the diagnostic information may be real time (i.e., data that is delivered immediately after collection) diagnostic information such as, without limitation, a real time current or a real time voltage. In some example embodiments of the disclosed concept, the wireless unit 22 is structured to provide the real time diagnostic information to the external device 30 via the wireless communication protocol in real time.

In some example embodiments of the disclosed concept, the wireless unit 22 is structured to receive setting information from the external device 30. The wireless unit 22 is structured to communicate with the electronic trip unit 20 to adjust settings of the circuit interrupter based on the setting information received from the external device 30.

In some example embodiments of the disclosed concept, the wireless unit 22 is configured to generate a web server and host a web page. The web page is able to be viewed via any suitable web browser (e.g., without limitation, Internet Explorer; Firefox; Safari; Opera; etc.). Information, such as the diagnostic information, may be viewed via the web page. Additionally, the wireless unit 22 may receive information, such as the electronic trip unit 20 settings, via the web page. As such, any external device 30 capable of browsing to the web page hosted by the wireless unit 22 may communicate with the wireless unit 22. Specialized software does not need to be installed on the external device 30. However, it is contemplated that in some example embodiments of the disclosed concept, the external device 30 may be configured to generate a user interface to display information received from the wireless unit 22.

In one example embodiment of the disclosed concept, the wireless unit 22 is configured to generate the web server and host the web page. The wireless unit 22 is also configured to wirelessly communicate via a wi-fi wireless communication protocol so that the external device 30 can access the web page. In another example embodiment of the disclosed concept, the wireless unit 22 is configured to communicate with the external device 30 via a Bluetooth wireless communication protocol. The external device 30 is configured to generate a user interface (e.g., via an application installed on the external device 30) to display information received from the wireless unit 22. It will be appreciated by those having ordinary skill in the art that these are but two example embodiments of the disclosed concept. Different wireless communication methods between the wireless unit 22 and the external device 30 may be employed without departing from the scope of the disclosed concept.

Figure 8:
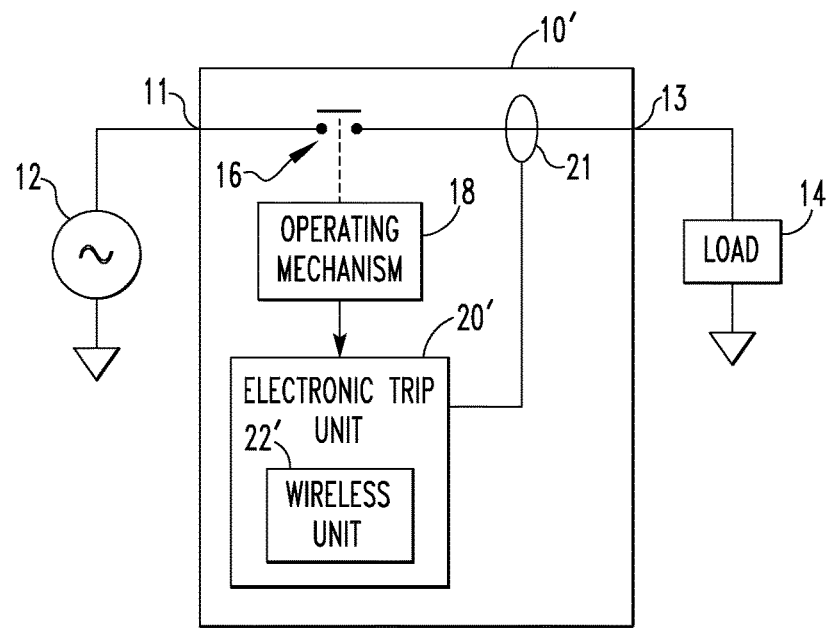
FIG. 8 is a schematic diagram of a circuit interrupter in accordance with another example embodiment of the disclosed concept.

While the wireless unit 22 and the electronic trip unit 20 are illustrated separately in FIG. 2, it is contemplated that the wireless unit 22 and the electronic trip unit 20 may be provided as separate components that are electrically connected with each other, as shown in FIG. 2, or integrated into a single component, as shown in FIG. 8. For example, referring to FIG. 8, a schematic diagram of a circuit interrupter 10' in accordance with an example embodiment of the disclosed concept is shown. The circuit interrupter 10' of FIG. 8 includes an electronic trip unit 20' which includes a wireless unit 22' integrated into it. It is also contemplated that the electronic trip unit 20' and the wireless unit 22' may be integrated together into a single component in other suitable manners. For example and without limitation, the electronic trip unit 20' and the wireless unit 22' may be integrated together in a processing unit. It is contemplated that other modules may be included in the processing unit in addition to the electronic trip unit 20' and the wireless unit 22'.

Figure 3:
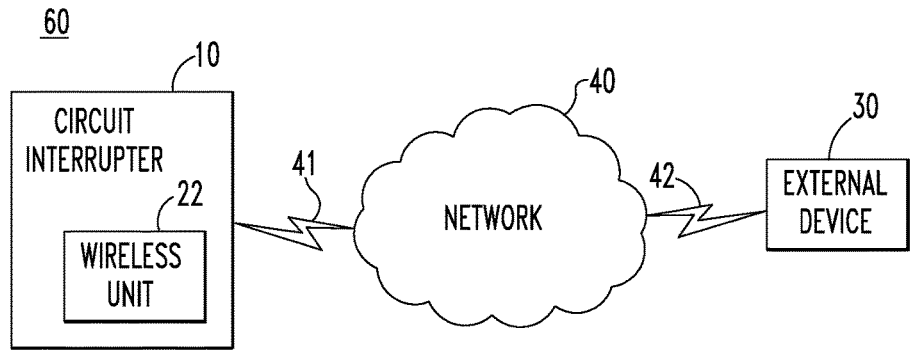
FIGS. 3 and 4 are schematic diagrams of communication systems including the circuit interrupter of FIG. 1 in wireless communication with an external device in accordance with example embodiments of the disclosed concept.

Referring to FIG. 3, a schematic diagram of a communication system 60 including the circuit interrupter 10 in wireless communication with the external device 30 in accordance with an example embodiment of the disclosed concept is shown. The wireless unit 22 may wirelessly communicate with the external device 30 via a network 40 (e.g., without limitation, a local area network, the Internet, or any other suitable network). The wireless unit 22 communicates with the external device 30 via a first connection 41 between the wireless unit 22 and the network 40 and a second connection 42 between the network 40 and the external device 30. The first connection 41 is a wireless connection. The second connection 42 may be a wireless connection as shown in FIG. 3 or a wired connection (not shown).

Figure 4:
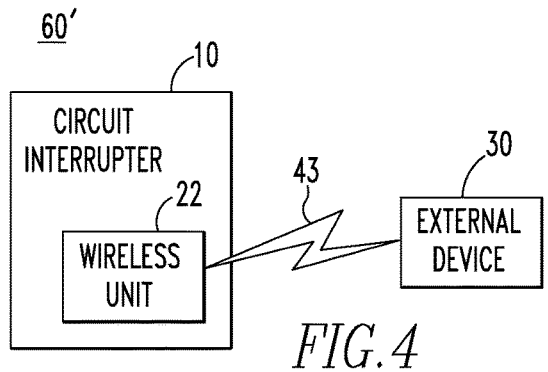

A schematic diagram of a communication system 60' including the circuit interrupter 10 in wireless communication with the external device 30 in accordance with another example embodiment of the disclosed concept is shown in FIG. 4. In the communication system 60' of FIG. 4, the wireless unit 22 wirelessly communicates directly with the external device 30 via a direct wireless connection 43, rather than via the network 40.

Figure 5:
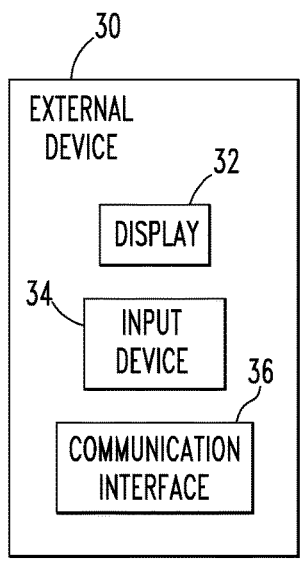
FIG. 5 is a schematic diagram of an external device in accordance with an example embodiment of the disclosed concept.

FIG. 5 is a schematic diagram of the external device 30. The external device 30 may be an electronic device configured to communicate with the wireless unit 22 such as, without limitation, a computer, a mobile phone, a tablet computer, or any other suitable electronic device. The external device 30 includes a display 32, an input device 34 and a communication interface 36.

The display 32 is configured to display information such as, without limitation, the diagnostic information received from the wireless unit 22. Any suitable type of electronic display may be employed as the display 32. The input device 34 is configured to receive inputs from a user of the external device 30. The input device 34 may be any device or combination of devices suitable for inputting information such as, without limitation, a keyboard, a mouse or a touch screen. The communication interface 36 is configured to facilitate communication with a network, such as the network 40 shown in FIG. 3, and/or other devices, such as the circuit interrupter 10 shown in FIG. 3.

While one example of an external device 30 is shown in FIG. 5, it is contemplated that a variety of different types of external devices 30 may be used in conjunction with the circuit interrupter 10 without departing from the scope of the disclosed concept.

Figure 6:
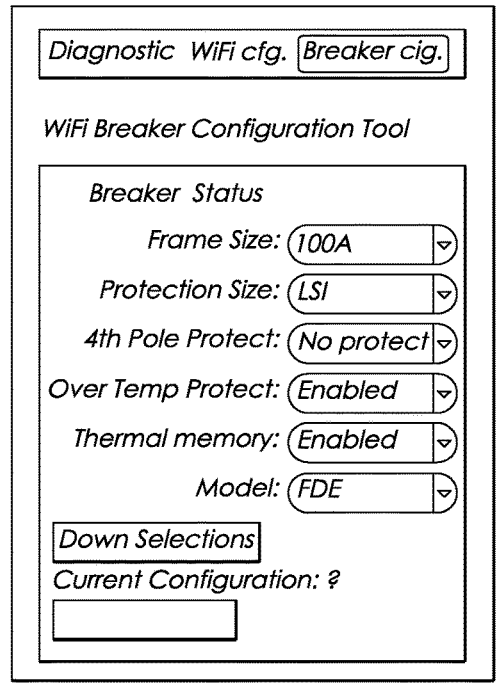
FIG. 6 is a view of a web page including circuit interrupter information in accordance with an example embodiment of the disclosed concept.

FIG. 6 is an example of a web page hosted by the wireless unit 22. The web page shown in FIG. 6 would be displayed on the external device 30 when the external device 30 is used to browse to the web page. As shown in FIG. 6, various setting and diagnostic information associated with the circuit interrupter 10 may be displayed on the web page. It will be appreciated by those having ordinary skill in the art that the web page in FIG. 6 is just one example of types of information that may be displayed via the web page. It will be appreciated that many different types of information associated with the circuit interrupter 10 may be displayed on the web page without departing from the scope of the disclosed concept. It will also be appreciated that the web page shown in FIG. 6 is but one example of a web page and that web pages having different appearances may be employed without departing from the scope of the disclosed concept.

In some example embodiments of the disclosed concept, the wireless unit 22 or the external device 30 is configured to generate a user interface for the external device 30 to display information received from the wireless unit 22. It is contemplated that the user interface may look the same or similar to the web page shown in FIG. 6. However, it will be appreciated that the user interface may have a different appearance without departing from the scope of the disclosed concept.

Figure 7:
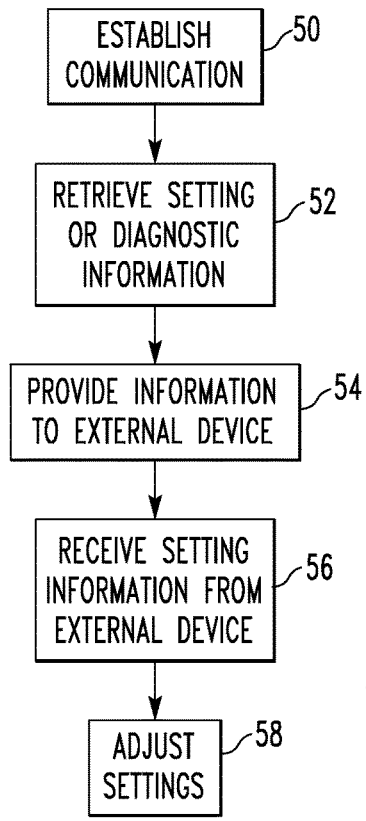
FIG. 7 is a flowchart of a method of communicating circuit interrupter information in accordance with an example embodiment of the disclosed concept.

FIG. 7 is a flowchart of a method for communicating circuit interrupter information in accordance with an example embodiment of the disclosed concept. It will be appreciated by those having ordinary skill in the art that the method may be implemented by the circuit interrupter 10 shown in FIGS. 2-4.

At 50, the circuit interrupter 10 establishes communication with the external device 30 via a wireless communication protocol. At 52, the circuit interrupter 10 retrieves setting or diagnostic information associated with the circuit interrupter 10. The setting or diagnostic information may be retrieved by the electronic trip unit 20 and provided to the wireless unit 22. At 54, the circuit interrupter 10 provides the setting or diagnostic information to the external device 30 via the wireless communication protocol. In some example embodiments of the disclosed concept, the setting and diagnostic information is provided to the external device 30 via a web page hosted on a web server generated by the wireless unit 22. At 56, the circuit interrupter 10 receives setting information from the external device 30 via the wireless communication protocol. In some example embodiments of the disclosed concept, the circuit interrupter 10 receives the setting information from the external device 30 via the web page hosted on the web server generated by the wireless unit 22. At 58, the circuit interrupter 10 adjusts the settings associated with it based on the setting information received from the external device 30.

In accordance with example embodiments of the disclosed concept, diagnostic and setting information associated with the circuit interrupter 10 may be viewed on an external device 30 without physically accessing the circuit interrupter 10. Additionally, settings associated with the circuit interrupter 10 may be adjusted with the external device 30 without physically accessing the circuit interrupter 10. Thus, the need for technicians to physically access the circuit interrupter 10 is reduced.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter comprising:
   a first terminal structured to electrically connect to a power source;
   a second terminal structured to electrically connect to a load;
   separable contacts electrically connected between the first terminal and the second terminal and being moveable between a closed position and an open position;
   an operating mechanism structured to trip open the separable contacts;
   an electronic trip unit structured to detect a fault condition based on power flowing between the first and second terminals and to retrieve diagnostic or setting information associated with the circuit interrupter; and
   a wireless unit structured to provide the setting or diagnostic information associated with the circuit interrupter to an external device via a wireless communication protocol, and
   wherein the wireless unit is structured to generate a web server and host a web page on the web server; and
   wherein the wireless unit is structured to provide the setting or diagnostic information associated with the circuit interrupter to the web page.

2. The circuit interrupter of claim 1, wherein the wireless unit is structured to receive setting information from the external device via the wireless communication protocol; and wherein the wireless unit is structured to communicate with the electronic trip unit to adjust settings of the circuit interrupter based on the setting information received from the external device.

3. The circuit interrupter of claim 1, wherein the diagnostic information includes real time diagnostic information associated with the circuit interrupter; and wherein the wireless unit is structured to continuously provide the real time diagnostic information associated with the circuit interrupter to the external device.

4. The circuit interrupter of claim 1, wherein the wireless unit is structured to receive setting information from the external device via the web page; and wherein the wireless unit is structured to communicate with the electronic trip unit to adjust setting of the circuit interrupter based on the setting information received from the external device.

5. The circuit interrupter of claim 1, wherein the web page is accessible to the external device via a web browser.

6. The circuit interrupter of claim 1, wherein the setting information associated with the circuit interrupter include at least one of full load ampere setting, long delay time, short delay pickup and short delay time.

7. The circuit interrupter of claim 1, wherein the diagnostic information associated with the circuit interrupter includes at least one of current information, voltage information, a number of trips, a last reason for tripping and a manufacturing date.

8. The circuit interrupter of claim 1, wherein the wireless communication protocol is selected from wi-fi, Bluetooth and Zigbee.

9. The circuit interrupter of claim 1, wherein the wireless unit is structured to communicate with the external device via a direct wireless connection to the external device.

10. The circuit interrupter of claim 1, wherein the wireless unit is structured to communicate with the external device via a network.

11. The circuit interrupter of claim 10, wherein the wireless unit is structured to communicate with the network via a first connection; wherein the network is structured to communicate with the external device via a second connection; and
wherein the first connection is a wireless connection and the second connection is a wireless or wired connection.

12. The circuit interrupter of claim 1, wherein the electronic trip unit and the wireless unit are integrated into a single component.

13. The circuit interrupter of claim 1, wherein the electronic trip unit and the wireless unit are separate components that are electrically connected with each other.

14. A method for communicating circuit interrupter information, the method comprising:
establishing communication with an external device via a wireless communication protocol;
retrieving setting or diagnostic information associated with the circuit interrupter;
providing the setting or diagnostic information to the external device via the wireless communication protocol;
generating a web server;
hosting a web page with the web server; and
providing the setting or diagnostic information to the web page.

15. The method of claim 14, further comprising:
receiving settings information from the external device via the wireless communication protocol; and
adjusting setting associated with the circuit interrupter based on the received settings information.

16. The method of claim 14, further comprising:
receiving settings information from the external device via the web page; and
adjusting settings associated with the circuit interrupter based on the received settings information.

17. The method of claim 14, wherein the web page is accessible to the external device via a web browser.

18. A communication system comprising:
an external device; and
a circuit interrupter structured to communicate with the external device via a wireless communication protocol, the circuit interrupter including,
a first terminal structured to electrically connect to a power source;
a second terminal structured to electrically connect to a load;
separable contacts electrically connected between the first terminal and the second terminal and being moveable between a closed position and an open position;
an operating mechanism structured to trip open the separable contacts;
an electronic trip unit structured to detect a fault condition based on power flowing between the first and second terminals and to retrieve diagnostic or setting information associated with the circuit interrupter; and
a wireless unit structured to provide the setting or diagnostic information associated with the circuit interrupter to the external device via the wireless communication protocol, and
wherein the wireless unit is structured to generate a web server and host a web page on the web server; wherein the wireless unit is structured to provide the setting or diagnostic information associated with the circuit interrupter to the web page; and wherein the external device is structured to access the web page via a web browser.

19. The communication system of claim 18, wherein the external device is at least one of a computer, a mobile phone and a tablet computer.

20. The communication system of claim 18, wherein the external device is structured to generate a user interface to display the setting or diagnostic information received from the wireless unit.

* * * * *